(12) United States Patent
Coughlan et al.

(10) Patent No.: US 7,970,115 B1
(45) Date of Patent: Jun. 28, 2011

(54) ASSISTED DISCRIMINATION OF SIMILAR SOUNDING SPEAKERS

(75) Inventors: Marc W. J. Coughlan, Rozelle (AU); Alexander Q. Forbes, Westleigh (AU); Alexander M. Scholte, Phegans Bay (AU); Peter D. Runcie, Bilgola Plateau (AU); Ralph Warta, Lane Cove (AU)

(73) Assignee: Avaya Inc., Basking Ridge, NJ (US)

( * ) Notice: Subject to any disclaimer, the term of this patent is extended or adjusted under 35 U.S.C. 154(b) by 1104 days.

(21) Appl. No.: 11/244,948

(22) Filed: Oct. 5, 2005

(51) Int. Cl.
*H04M 3/42* (2006.01)

(52) U.S. Cl. ............... 379/202.01; 704/207; 704/234; 704/238

(58) Field of Classification Search ........... 379/202.01, 379/142.01; 704/207, 231, 238, 233, 234
See application file for complete search history.

(56) References Cited

U.S. PATENT DOCUMENTS

| | | | |
|---|---|---|---|
| 6,178,400 B1* | 1/2001 | Eslambolchi | 704/234 |
| 6,792,092 B1* | 9/2004 | Michalewicz | 379/202.01 |
| 2004/0013252 A1* | 1/2004 | Craner | 379/142.01 |
| 2004/0064314 A1* | 4/2004 | Aubert et al. | 704/233 |
| 2006/0025990 A1* | 2/2006 | Boillot et al. | 704/207 |
| 2006/0067500 A1* | 3/2006 | Christofferson et al. | 379/202.01 |
| 2006/0106603 A1* | 5/2006 | Boillot et al. | 704/238 |

OTHER PUBLICATIONS

Buder, E. and Eriksson, A., *Time-Series Analysis of Conversational Prosody for the Identification of Rhythmic Units*, ICPhS99, San Francisco, pp. 1071-1074 (undated).
Ingulfsen, T., *Influence of syntax on prosodic boundary prediction*, University of Cambridge, Computer Laboratory, Technical Report No. 610, UCAM-CL-TR-610, ISSN 1476-2986, pp. 1-49, Dec. 2004.
Sanders, E. and Taylor, P., *Using Statistical Models to Predict Phrase Boundaries for Speech Synthesis*, 4 pages (undated).
Huang, T. and Turner, K, *Policy Support for H.323 Call Handling*, Computing Science and Mathematics, University of Stirling, Stirling FK9 4LA, UK, pp. 1-22, Dec. 23, 2004.
*ADIX APS System Features*, Chapter 2, pp. 1-36, internet address: http://64.233.167.104/search?q=cache:aPYgXe8DIqoi:www.iwatsu.com/DocLibrary/Gen..., printed Jul. 20, 2005.
Time- and pitch-scale Modification of Speech, Geyer, et al., Diploma Thesis, 2000; at http://control.ee.ethz.ch/index.cgi?page=publications&action=details&id=565, 2 pages.
Pitch-Based Emphasis Detection for Characterization of Meeting Recordings, Kennedy et al, LabROSA, Dept. of Electrical Engineering, Columbia University, New York, NY 10027; 6 pages.
ESCA wprkshop o n autpmatic Speaker Recognition, identification and verification incorporating discrimiating observation probabilities (DOP) into Semi-continuous HMM, 13 pages.
An FO-Contour Based Speaker Recognizer, M. Hoffman, at http://www.cs.princeton.edu/~mdhoffma/prosody/prosody.htm 3 pages.
Discriminating Semi-Continuous HMM for Speaker Verification, M.E. Forsyth et al., 1994 IEEE; pp. I-313-I-316.

* cited by examiner

*Primary Examiner* — Ahmad F Matar
*Assistant Examiner* — Sonia Gay
(74) *Attorney, Agent, or Firm* — Sheridan Ross P.C.

(57) ABSTRACT

A communications system is provided that includes:
 (a) a speech discrimination agent 136 operable to generate a speech profile of a first party to a voice call; and
 (b) a speech modification agent 140 operable to adjust, based on the speech profile, a spectral characteristic of a voice stream from the first party to form a modified voice stream, the modified voice stream being provided to the second party.

22 Claims, 4 Drawing Sheets

ASSISTED DISCRIMINATION OF SIMILAR SOUNDING SPEAKERS

FIELD OF THE INVENTION

The invention relates generally to teleconferencing systems and particularly to speaker identification in teleconferencing systems.

BACKGROUND OF THE INVENTION

Teleconferencing systems are in widespread use around the world. In such systems, audio streams are provided to the various endpoints to the conference call. The streams may be mixed or combined at one or more of the endpoints and/or at a switch. Although some teleconferencing is done with video images of the various participants, most teleconferencing is still performed using audio alone.

Because most conference calls do not have real time video feed of each of the participants during the call, it is often difficult for a participant to discriminate between remotely located speakers. The participant having difficulty discriminating between the voices of two or more conference participants is hereinafter referred to as the "disadvantaged participant".

Different speakers can sound alike to a participant for a variety of reasons. For example, it is not unusual for individuals to have similar sounding voices. Poor quality links can cause two otherwise dissimilar sounding speakers to sound similar. Interference can be so pronounced that a remote caller cannot distinguish between several similar sounding people on a call even though the other participants can. Finally, the individual himself may be hard-of-hearing or have some other type of hearing impairment that causes speakers to sound very similar.

Being unable to discriminate between speakers can cause a disadvantaged conference participant to make incorrect assumptions about who is actually speaking at any point in time. As a result, the disadvantaged participant can address the wrong individual in their remarks, which is embarrassing at the least, or be confused about who said what, which can lead to problems after the call is over.

SUMMARY OF THE INVENTION

These and other needs are addressed by the various embodiments and configurations of the present invention. The present invention is directed generally to speech modification and particularly to speech modification in voice calls.

In one embodiment, the present invention is directed to a method including the steps of:

(a) generating a speech profile (e.g., a pitch or prosodic profile) of a first party to a voice call;

(b) adjusting, based on the speech profile, a spectral characteristic (e.g., pitch, frequency, f0/Hz) of a voice stream from the first party to form a modified voice stream; and (c) audibly providing the modified voice stream to a second party to the voice call.

As will be appreciated, the voice call may be in real-time or delayed. An example of a delayed voice call is the replaying of a voice mail message received earlier from another caller and a pre-recorded conference call. The retrieving party calls into the voice mail server and, after authentication is completed successfully, audibly receives playback of the recorded message.

In a particular application, the invention is applied to conference calls and assists disadvantaged callers (i.e., the second party), such as remote callers using poor quality links, to discern between two or more similar sounding call participants. Poor quality links can result for example from Internet congestion in a Voice Over IP or VoIP call (leading to a low Quality of Service (QoS)), from a poor wireless connection in a wireless call, or from a poor connection in a traditional phone line.

The conferencing system builds a profile of each of the speakers on the call. This is typically done during the first few minutes of the call. The profile is preferably a pitch profile, though other types of profiles may be employed.

When the disadvantaged party requires assistance in discriminating between speakers, he activates a feature on the conferencing unit, such as a by entering a feature code.

The conferencing unit then compares all of the speech profiles of the other participants and identifies pairs of profiles that are very similar (within specified thresholds which are preset or configured, such as remotely, by the disadvantaged party.

The conferencing unit then starts mixing the modified voice stream that will be output solely to the disadvantaged party and/or to other callers who have requested the new feature. As the conferencing unit mixes the new voice (media) stream, it applies an algorithm that modifies the speech of the similar sounding speakers in a way that accentuates the differences between them. The disadvantaged party thus hears the conference participants with a much greater ability to distinguish between similar sounding speakers.

In one configuration, at least two parties to the same conference call receive, substantially simultaneously, different voice streams from a common participant. In other words, one party receives the unmodified (original) voice stream of the participant while the other party receives the modified voice stream derived from the original voice stream.

These and other advantages will be apparent from the disclosure of the invention(s) contained herein.

As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The above-described embodiments and configurations are neither complete nor exhaustive. As will be appreciated, other embodiments of the invention are possible utilizing, alone or in combination, one or more of the features set forth above or described in detail below.

DETAILED DESCRIPTION

The invention will be illustrated below in conjunction with an exemplary communication system. Although well suited for use with, e.g., an enterprise network switch, the invention is not limited to use with any particular type of communication system switch or configuration of system elements. Those skilled in the art will recognize that the disclosed techniques may be used in any communication application in which it is desirable to provide improved communications.

Figure 1:
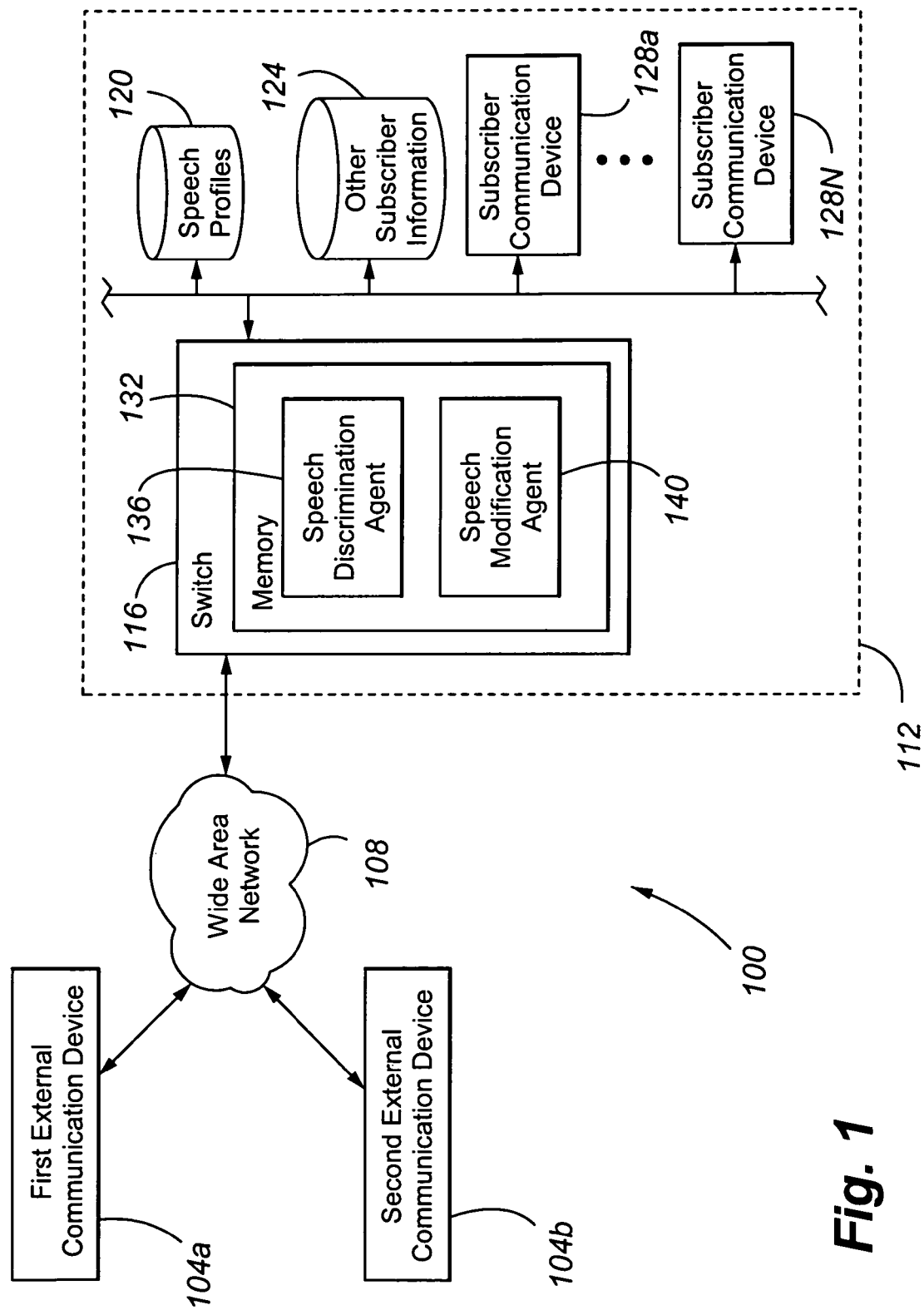
FIG. 1 is a block diagram of an enterprise network according to an embodiment of the present invention.

With reference to FIG. 1, a telecommunications architecture according to an embodiment of the present invention is depicted. The architecture 100 includes first and second external communication devices 104a,b, a Wide Area Network or WAN 108, and an enterprise network 112. The enterprise network 112 includes a switch 116, a speech profile database 120, a database 124 containing other subscriber information, and a plurality of communication devices 128a-n administered by the switch 116.

The first and second external communication devices 104a,b are not administered by the switch 116 and are therefore considered by the enterprise network 112 to be external endpoints. The devices 104a,b may be packet- or circuit-switched. Exemplary external communication devices include packet-switched voice communication devices (such as IP hardphones (e.g., Avaya Inc.'s 4600 Series IP Phones™) and IP softphones such as Avaya Inc.'s IP Softphone™), circuit-switched voice communication devices (such as wired and wireless analog and digital telephones), Personal Digital Assistants or PDAs, Personal Computers or PCs, laptops, H.320 video phones and conferencing units, voice messaging and response units, and traditional computer telephony adjuncts.

WAN 108 may be packet- or circuit-switched. For example, WAN 108 can be the Internet or the Public Switched Telephone Network.

The switch 116 can be any suitable voice communication switching device, such as Private Branch eXchange or PBX, an Automatic Call Distributor or ACD, an enterprise switch, an enterprise server, or other type of telecommunications system switch or server, as well as other types of processor-based communication control devices such as media servers, computers, adjuncts, etc. The switch 116 directs contacts to one or more telecommunication devices and is preferably a modified form of Avaya Inc.'s Definity™ Private-Branch Exchange (PBX)-based ACD system; MultiVantage™ PBX, CRM Central 2000 Server™, Communication Manager™, and/or S8300™ media server. Typically, the switch is a stored-program-controlled system that conventionally includes interfaces to external communication links, a communications switching fabric, service circuits (e.g., tone generators, announcement circuits, etc.), memory for storing control programs and data, and a processor (i.e., a computer) for executing the stored control programs to control the interfaces and the fabric and to provide automatic contact-distribution functionality. The switch typically includes a network interface card (not shown) to provide services to the serviced telecommunication devices and a conferencing function within the switch and/or in an adjunct. As will be appreciated, the conferencing functionality may be in a multi-party conference unit located remotely from the switch or in one or more endpoints such as a communication device. Other types of known switches and servers are well known in the art and therefore not described in detail herein.

The speech profile database 120 contains a speech profile for each subscriber and optionally nonsubscribers indexed by a suitable identifier. In one configuration, the speech profile is a pitch profile of the type shown in FIGS. 2-7. The identifier can be a party name, employee identification number, an electronic address of a communication device associated with a subscriber (such as a telephone number), and the like.

The database 124 contains subscriber information for each subscriber of the enterprise network. Subscriber information includes, for example, subscriber name, employee identification number, and an electronic address associated with each of the subscriber's internal and external communication devices.

The subscriber communication devices 128 can be any of the communication devices described above. In a preferred configuration, each of the telecommunication devices 128, . . . 128n corresponds to one of a set of internal extensions Ext1, . . . ExtN, respectively. These extensions are referred to herein as "internal" in that they are extensions within the premises that are directly serviced by the switch 116. More particularly, these extensions correspond to conventional telecommunication device endpoints serviced by the switch, and the switch can direct incoming contacts to and receive outgoing contacts from these extensions in a conventional manner.

Included in the memory 132 of the switch 116 are a speech discrimination agent 136 and a speech modification agent 140. The speech discrimination agent 136 maintains (e.g., generates and updates) speech profiles for each subscriber and other conference participants and creates speech modifier(s) to distinguish or disambiguate speech from similar sounding speakers in calls between subscribers on internal endpoints and/or between a subscriber on an internal endpoint and one or more other parties on external endpoints. The speech modification agent 140, when invoked by a subscriber (the disadvantaged participant) during a multi-party conference call, applies the speech modifier(s) to one or both of similar sounding speakers to provide an altered or modified voice stream, mixes or combines the original or unaltered voice streams of the other participants with the altered voice stream(s) of the similar sounding speaker(s), and provides the combined stream to the disadvantaged participant. As will be appreciated, the agents 136 and 140 may alternatively be included in a multi-party conferencing unit, such as a modified form of Avaya Inc.'s Avaya Meeting Exchange™, that is an adjunct to the switch 116 and/or included within one or more of the voice communication devices 104a,b and 128a-n.

Speech profiling may be done by the agent 136 by a number of differing techniques.

In one technique, speech profiling is done by pitch-based techniques in which cues, namely speaker-normalized pitch, are isolated and extracted. In one approach, a pitch estimator, such as a Yin pitch estimator, is run over the individual participants speech streams to extract pitch versus time for each of the participants. Two parameters are provided by this technique, namely an actual pitch estimate (which is given as a deviation in octaves from A440 (440 Hz)) over a selected number of samples) and the "a periodicity" (which is a measure of just how aperiodic the signal is during a given sample). The more aperiodic the signal is, the less reliable the pitch estimate is. This approach is discussed in detail in Kennedy, et al., *Pitch-Based Emphasis Detection for Characterization of Meeting Recordings*, LabROSA, Dep't of Electrical Engineering, Columbia University, New York, which is incorporated herein by this reference. In another approach, a pitch period detector, such as an AUTOC, SIFT, or AMDF pitch period detector, and pitch-synchronous overlap/add algorithm, are run over the individual participants speech streams to extract pitch versus time for each of the participants. This approach is discussed in detail in Geyer, et al., *Time- and Pitch-Scale Modification of Speech*, Holmdel, N.J., Diploma Thesis at the Bell Labs, which is incorporated herein by this reference. Under either approach, the profile of each speaker is preferably of the form shown in FIGS. 2-7.

In another technique, the agent 136 performs prosodic analysis of each participants voice stream. The agent 136 identifies the temporal locations of probable prosodic boundaries in the voice stream, typically using speech rhythms. The agent 136 preferably performs a syntactic parse of the voice stream and then manipulates the structure to produce a prosodic parse. Parse strategies include without limitation triagram probabilities (in which every triagram in a sentence is considered and a boundary is placed when the probability is over a certain threshold). Other techniques may be employed, such as the annotation of text with part-of-speech via supertags, parse trees and prosodic boundaries and the consideration not only of triagram probabilities but also distance probability as discussed in *Using Statistical Models to Predict Phrase Boundaries for Speech Synthesis* by Sanders, et al., Nijmegan University and Centre for Speech Technology Research, University of Edinburgh, and syntactic chunks to link grammar, dependency trees, and syntactic constituents as discussed in *Influence of Syntax on Prosodic Boundary Prediction*, to Ingulfsen, University of Cambridge, Technical Report No. 610 (December 2004), each of which is incorporated herein by this reference. In this configuration, the profile of each participant is derived from the prosodic parse of the voice stream.

The profile of each conference participant may be discarded after the conference call is over or retained in permanent memory for future conference calls involving one or more of the parties. In one configuration, the enterprise network maintains, in the database 120, a speech profile for each subscriber.

Comparisons of the speech profiles of the various conference participants to identify "similar" sounding speakers can be done by a variety of techniques. In one technique, speaker verification techniques are employed, where a degree of similarity between the two selected speech profiles of differing participants is determined. This may be done using Markov Models, such as continuous, semi-continuous, or discrete hidden Markov Models, or other standard techniques. In one configuration, the speaker profile of one participant is compared against the speaker profile of another participant, and an algorithm, such as the Viterbi algorithm, determines the probability of the speech having come from the same speaker. This is effectively equivalent to a degree of similarity of the two speech profiles. If the probability is above a certain threshold, the profiles are determined to be similar. If the probability is below the threshold, the profiles are determined to be dissimilar. Normalization may be used to increase the accuracy of the "degree of similarity" conclusion. Another technique, is discriminative observation probabilities in which the difference between the profiles is normalized into probabilities in the range of 0 to 1. These approaches are discussed in Forsyth, *ESCA Workshop on Automatic Speaker Recognition, Identification, and Verification Incorporating Discriminating Observation Probabilities (DOP) into Semi-Continuous HMM*, Hoffman, *An F0-Contour Based Speaker Recognizer*, and Forsyth et al., *Discriminating Semi-Continuous HMM for Speaker Verification*, Centre for Speech Technology Research, Edinburgh, Scotland, each of which is incorporated herein by this reference. Another technique is to compare parameters describing the profile. Exemplary parameters include median or mean, peak value, maximum and minimum values in the profile distribution, and standard deviation. For example, if a first speaker's profile has a first mean and a first standard deviation and a second speaker's profile has a second mean and a second standard deviation the first and second profiles are deemed to be similar when the difference between the first and second means is less than a specified first threshold, and the difference between the first and second standard deviation is less than a specified second threshold. Otherwise, the profiles are deemed to be dissimilar.

Figure 2:
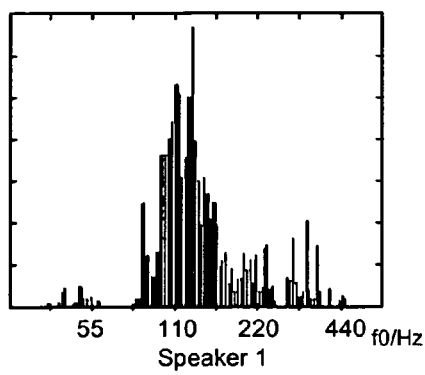
FIG. 2 is a plot of fo/Hz (horizontal axis) and pitch (vertical axis) depicting a pitch profile of a first speaker.
Figure 3:
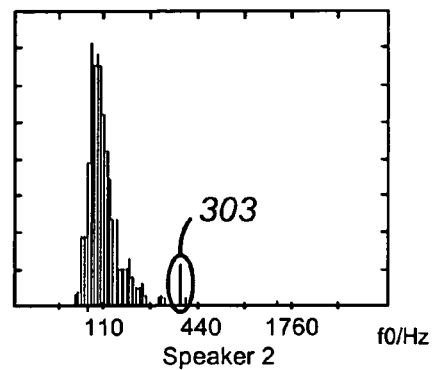
FIG. 3 is a plot of fo/Hz (horizontal axis) and pitch (vertical axis) depicting a pitch profile of a second speaker.
Figure 4:
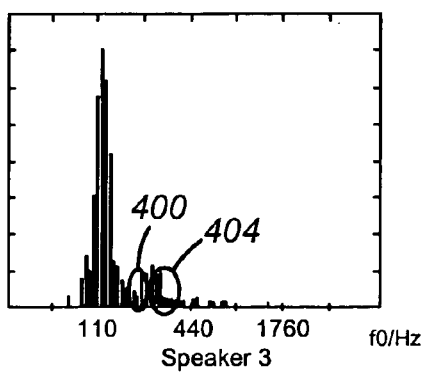
FIG. 4 is a plot of fo/Hz (horizontal axis) and pitch (vertical axis) depicting a pitch profile of a third speaker.
Figure 5:
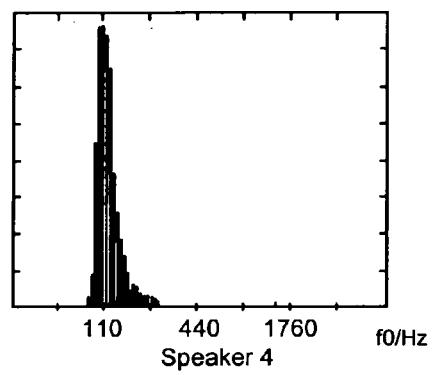
FIG. 5 is a plot of fo/Hz (horizontal axis) and pitch (vertical axis) depicting a pitch profile of a fourth speaker.
Figure 6:
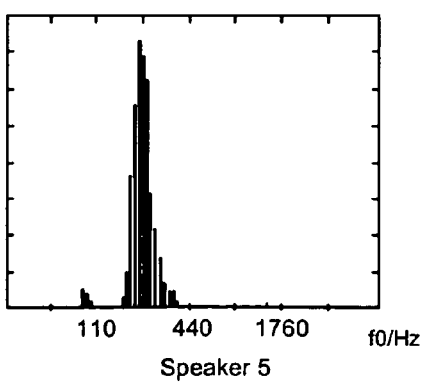
FIG. 6 is a plot of fo/Hz (horizontal axis) and pitch (vertical axis) depicting a pitch profile of a fifth speaker.
Figure 7:
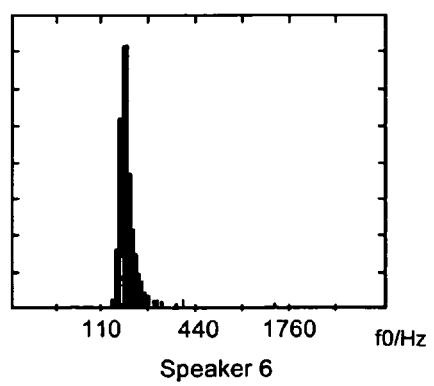
FIG. 7 is a plot of fo/Hz (horizontal axis) and pitch (vertical axis) depicting a pitch profile of a sixth speaker.

Examples of similar and dissimilar profiles are shown in FIGS. 2-7. The profile in FIG. 2 is from a first speaker, that in FIG. 3 is from a second speaker, that in FIG. 4 is from a third speaker, that in FIG. 5 is from a fourth speaker, that in FIG. 6 is from a fifth speaker, and that in FIG. 7 is from a sixth speaker. As can be seen from the Figs., the profiles of the second, third, and fourth speakers are similar while those of the first, fifth, and sixth speakers are dissimilar to any of the other profiles. The second, third and fourth profiles are similar in that they each have similar peaks (around 110 f0/Hz) and similar distribution ranges (from 75 to 275 f0/Hz) but are also different in a number of respects. Differences include for the second speaker the spike 300 around 400 f0/Hz, for the third speaker the dip 400 at 225 f0/Hz and supplemental distribution 404 between 225 and 300 f0/Hz, and for the fourth speaker the extremely low pitches from 225 to 440 f0/Hz.

The agent 136 further creates speech modifier(s) to distinguish the similar speech profiles from one another. The modifier(s) can modify or alter the magnitude of the pitch or the shape and location of the distribution (e.g., make the distribution narrower or broader by adjusting the standard deviation, minimum and/or maximum f0/Hz values, mean, median, and/or mode value, peak value, and the like and/or by frequency shifting). In one configuration, the voice stream of a targeted user is spectrally decomposed, the pitch values over a selected series of f0/Hz segments adjusted, and the resulting decomposed pitch segments combined to form the adjusted or modified voice stream having a different pitch distribution than the original (unmodified) signal.

An example of voice stream modification will be discussed with reference to FIGS. 2-7. One approach to distinguishing the second speaker from the third and fourth speakers is to amplify the magnitude of the spike 300 at approximately 400 f0/Hz by multiplying the pitch value in the voice stream received from the second speaker by a value greater than 1 or by offsetting the spike to a different f0/Hz value, such as 440 Hz. An approach to distinguish the third speaker from the second and fourth speakers is to reduce (by multiplying by a value less than 1) the pitch value at 225 f0/H to emphasize the dip 400 and/or amplify (by multiplying by a value greater than 1) the pitch values between 225 and 300 f0/Hz to amplify the supplemental distribution 404. An approach to distinguish the fourth speaker from the second and third speakers is to reduce the pitch values from 225 to 440 f0/Hz.

Where more than one conference call participant is in a common room, the various voice streams from the various participants must be isolated, individually profiled, and, if needed, adjusted by suitable speech modifiers. In one configuration, a plurality of microphones are positioned around the room. Triangulation is performed using the plurality of voice stream signals received from the various microphones to locate physically each participant. Directional microphone techniques can then be used to isolate each participants voice stream. Alternatively, blind source separation techniques can be employed. In either technique, the various voice streams are maintained separate from each other and combined at the switch, or an endpoint to the conference call.

Figure 8:
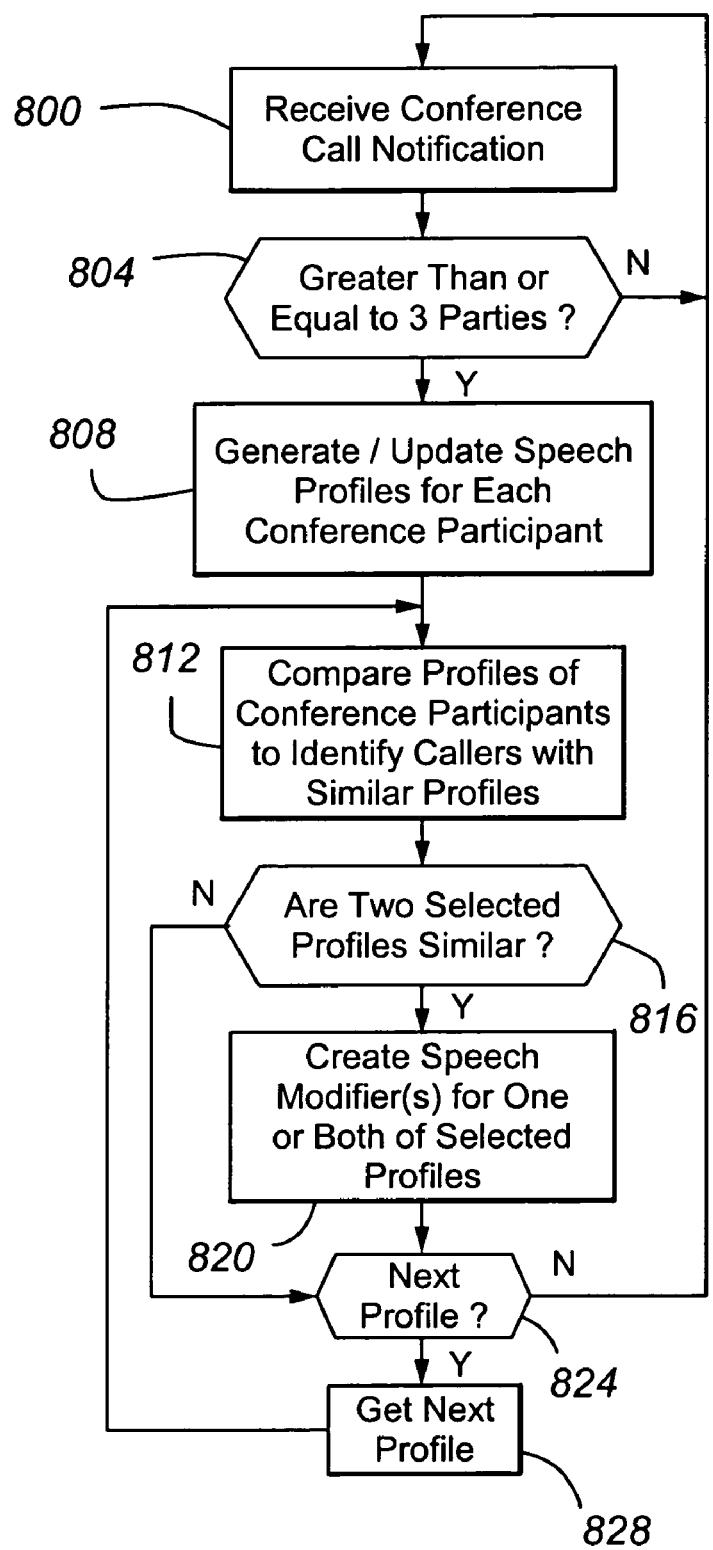
FIG. 8 is a flowchart depicting an operational embodiment of a speech discrimination agent.

The operation of the speech discrimination agent 136 will now be discussed with reference to FIG. 8.

In step 800, the agent 136 is notified that a multi-party conference call involving one or more subscribers is about to commence or is already in progress.

In decision diamond 804, the agent 136 determines whether there are at least three parties to the conference call. If only two parties are on the call, there can be no disadvantaged participant as only one party is on the other line. If there are three or more parties, the agent 136 proceeds to step 808. In one configuration, this decision diamond 804 is omitted.

In step 808, the agent 136 generates and/or updates speech profiles for each conference participant, both subscribers and nonsubscribers. The profiles are generated and/or updated as the various participants converse during the call. The profiles may be stored in temporary or permanent storage. During the course of the call, the profiles are continually refined as more speech becomes available from each participant for analysis.

In step 812, the agent 136 compares selected pairs of profiles of differing conference call participants to identify callers with similar profiles. This step is typically performed as the voice profiles are built in step 808.

In decision diamond 816, it is determined whether any voice profiles are sufficiently similar to require modification. If not, the agent 136 proceeds to decision diamond 824 and determines if there is a next profile that has not yet been compared with each of the profiles of the other participants. If not, the agent 136 proceeds to step 800. If so, the agent gets the next profile in step 828 and returns to and repeats step 812.

If two or more voice profiles are sufficiently similar, the agent 136, in step 820, creates one or more speech modifiers for one or more of the similar profiles. The speech modifiers accentuate the differences enough for the different callers to be discernible to other parties on the call. If pitch modification is the technique used, the modifiers may be thought of as similar to "graphic equalizers" used in audio music systems. In graphic equalizers, individual frequency ranges can be boosted or decreased at the discretion of the user. In the present invention, different settings are applied to each of the similar sounding callers.

After step 820 is completed as to a selected pair of profiles, the agent 136 proceeds to decision diamond 824.

Figure 9:
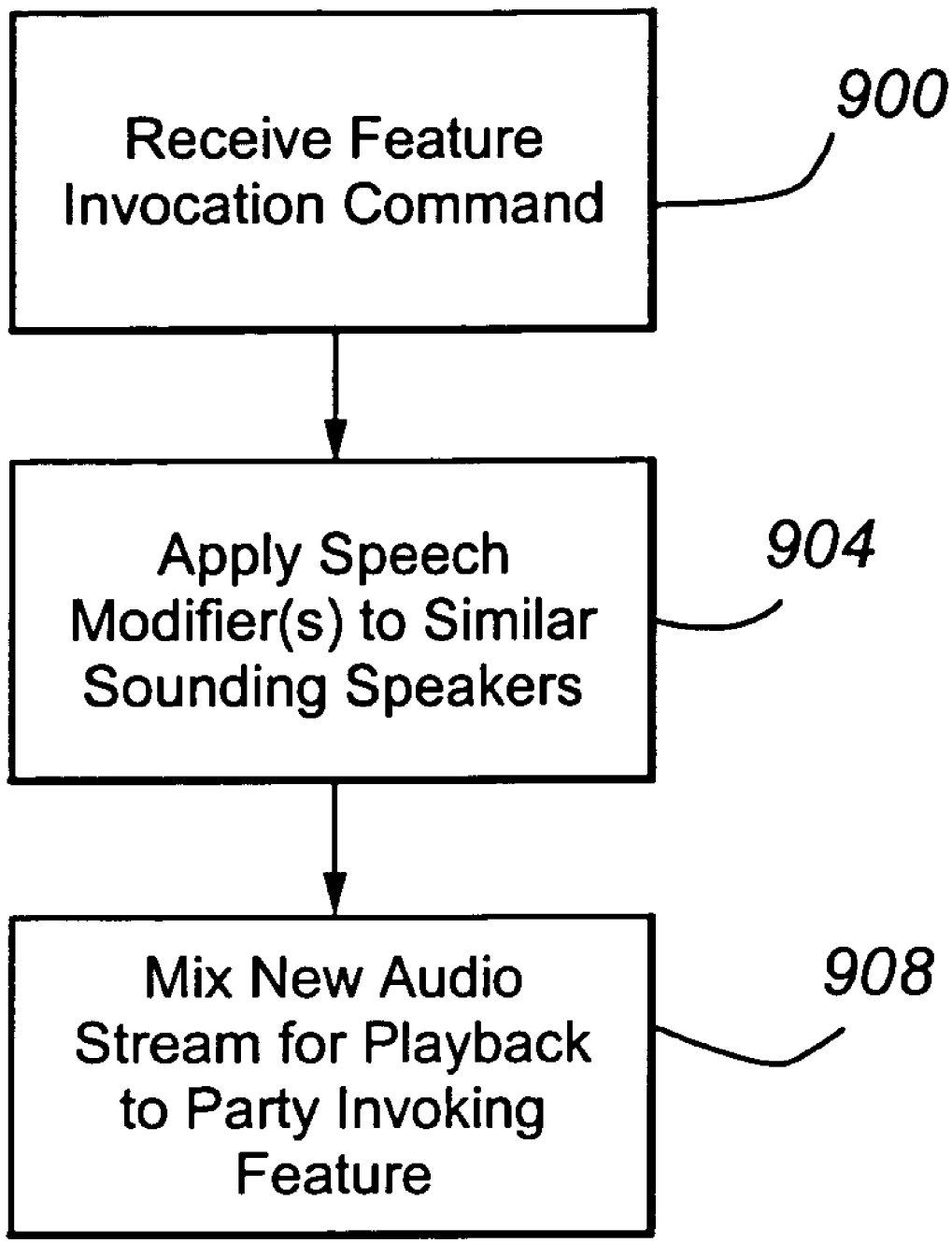
FIG. 9 is a flowchart depicting an operational embodiment of a speech modification agent.

The operation of the speech modification agent 140 will now be discussed with reference to FIG. 9.

In step 900, the agent 140 receives a feature invocation command from a disadvantaged participant. The feature invoked is the "assisted discrimination" feature, which distinguishes similar sounding speakers as noted above. A participant may invoke the feature by any user command, such as a one or more DTMF signals, a key press, clicking on a graphical icon, and the like.

In step 904, the agent 140 applies speech modifier(s) to similar sounding speakers. In the configuration noted above, the agent 136 automatically determines which of the speakers are similar sounding. In another configuration, the user indicates which participants he considers to be similar sounding by pressing a key or clicking on an icon when the similar sounding speakers are speaking and/or selecting the similar sounding person from a list. In response, the speaker is tagged and the tagged speaker identifiers provided to the agent 136. The agent generates suitable speech modifiers and provides them to the agent 140.

In step 908, the audio streams, both the modified stream(s) from a similar sounding speaker and the unmodified stream(s) from dissimilar sounding speakers, are combined and provided to the disadvantaged participant.

A number of variations and modifications of the invention can be used. It would be possible to provide for some features of the invention without providing others.

For example in other alternative embodiments, the agents 136 and 140 are embodied in hardware (such as a logic circuit or Application Specific Integrated Circuit or ASIC), software, or a combination thereof.

In another embodiment, the present invention is used in a voice call involving two or more parties to discriminate voice streams from interference. Interference can have spectral components similar to spectral components of a voice stream. For example, at a set of frequencies, interference can produce pitch values similar to those produced by the voice stream over the same set of frequencies. Where such "similarities" are identified, the speech modification agent can alter the overlapping spectral components either of the interference or of the voice stream to discriminate between them. For example, the overlapping spectral components of the voice stream can be moved to a different set of frequency values so that the spectral components of the interference and modified voice stream are no longer overlapping. Conversely, the overlapping spectral components of the interference can be moved to a different set of frequency values so that the spectral components of the interference and modified voice stream are no longer overlapping. Alternatively, the overlapping spectral components of the voice stream can be positively amplified (using an amplification factor of greater than one) and/or of the interference can be negatively amplified (using an amplification factor of less than one). Interference may be identified and isolated using known techniques, such as call classifiers, echo cancellers, and the like.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g., for improving performance, achieving ease and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover, though the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method of managing a conference call including at least three conference call participants, comprising:
   during a multiparty conference call, a processor receiving from a second conference call participant a request to discriminate between first and third conference call participants, wherein the request identifies the first and third participants;
   generating a profile associated with each conference call participant;
   during the conference call, refining each profile based on one or more of speech profiling and prosodic analysis;
   in response to the request, automatically comparing the profiles for the first and third conference call participants to determine similarities in one or more spectral characteristics;
   in response to the comparison, automatically isolating, by the processor, a first spectral characteristic of a received voice stream of one of the first and third conference call participants to form a modified voice stream of the one of the first and third conference call participants;
   adjusting the modified voice stream by one or more suitable speech modifiers determined by a speech modification agent; and
   providing, by the processor, the modified voice stream to a communication device for audible presentation to the second conference call participant.

2. The method of claim 1, wherein the received voice stream is received from the first conference call participant, wherein the received voice stream is provided to the third conference call participants, and wherein at least a first spectral characteristic of the received and modified voice streams differs.

3. The method of claim 1, wherein a common voice stream is received from a common communication device used by the first and third conference call participants, the common voice stream comprising first and third voice streams from the first and third conference call participants, respectively.

4. The method of claim 1, wherein first and third speech profiles are generated for the first and third conference call participants, wherein the first and third speech profiles are a pitch profile, and wherein the spectral characteristic is at least one of a magnitude of a pitch value, a shape of the pitch distribution, and a location of the pitch distribution.

5. The method of claim 4, wherein the spectral characteristic is the magnitude of the pitch value and wherein the pitch value of the modified voice stream is either decreased or increased relative to the received voice stream.

6. The method of claim 4, wherein the spectral characteristic is a shape of the pitch distribution and wherein, in the profile distribution of the modified voice stream, at least one of the median pitch value, mean pitch value, maximum and minimum frequency values, and standard deviation is different from a corresponding at least one of the median pitch value, mean pitch value, maximum and minimum frequency values, and standard deviation of the pitch distribution of the received voice stream.

7. The method of claim 1, wherein the adjusting step comprises the substeps of:
   decomposing the received voice stream into a plurality of subcomponents;
   adjusting at least one of the subcomponents; and
   recombining the subcomponents to form the modified voice stream, wherein, in the modified voice stream, the adjusted at least one subcomponent replaces the subcomponent from which the adjusted at least one subcomponent was derived.

8. A non-transitory computer readable medium comprising processor executable instructions that, when executed, perform the steps of claim 1.

9. A system that manages a conference call including at least three conference call participants, comprising:
   a processor operable to:
      during a multiparty conference call, receive from a second conference call participant, a request to discriminate between first and third conference call participants, wherein the request identifies the first and third participants;
      generate a profile associated with each conference call participant;
      refine, during the conference call, each profile based on one or more of speech profiling and prosodic analysis;
      in response to the request, automatically compare the profiles for the first and third conference call participants;
      determine one or more similar spectral characteristics in the profiles for the first and third conference call participants;
      execute a speech modification agent, wherein the speech modification agent is operable to determine one or more suitable speech modifiers to modify the one or more similar spectral characteristics in the profiles for the first and third conference call participants;
      in response to the determination of the one or more suitable speech modifiers, automatically adjust a first spectral characteristic of a received voice stream of a selected one of the first and third conference call participants to form a modified voice stream with one or more suitable speech modifiers; and
      provide the modified voice stream to a communication device for audible presentation to the second conference call participant.

10. The system of claim 9, wherein the received voice stream is received from the first conference call participant, wherein the received voice stream is provided to the third conference call participants, and wherein at least a first spectral characteristic of the received and modified voice streams differs.

11. The system of claim 9, wherein a common voice stream is received from a common communication device used by the first and third conference call participants, the common voice stream comprising first and third voice streams from the first and third conference call participants, respectively.

12. The system of claim 9, wherein first and third speech profiles are generated for the first and third conference call participants, wherein the first and third speech profiles are a pitch profile, and wherein the spectral characteristic is at least one of a magnitude of a pitch value, a shape of the pitch distribution, and a location of the pitch distribution.

13. The system of claim 12, wherein the spectral characteristic is the magnitude of the pitch value and wherein the pitch value of the modified voice stream is either decreased or increased relative to the received voice stream.

14. The system of claim 12, wherein the spectral characteristic is a shape of the pitch distribution and wherein, in the profile distribution of the modified voice stream, at least one of the median pitch value, mean pitch value, maximum and minimum frequency values, and standard deviation is different from a corresponding at least one of the median pitch value, mean pitch value, maximum and minimum frequency values, and standard deviation of the pitch distribution of the received voice stream.

15. The system of claim 9, wherein the adjusting operation comprises the sub-operations:
decompose the received voice stream into a plurality of subcomponents;
adjust at least one of the subcomponents; and
recombining the subcomponents to form the modified voice stream, wherein, in the modified voice stream, the adjusted at least one subcomponent replaces the subcomponent from which the adjusted at least one subcomponent was derived.

16. A method, comprising:
a processor receiving for a disadvantaged conference call participant a voice stream from a first conference call participant and at least one other conference call participant;
automatically creating, by the processor, a speech profile for each of the first conference call participant and the at least one other conference call participant based on one or more of speech profiling and prosodic analysis;
during the multiparty conference call, automatically refining, by the processor, the speech profiles for the first conference call participant and the at least one other conference call participant;
automatically comparing, by the processor, the speech profiles for the first conference call participant and the at least one other conference call participant
automatically determining, based on a comparison of the speech profiles, that the voice stream from the first conference call participant is similar to another conference call participant;
adjusting, by the processor, a spectral characteristic of the received voice stream to form a modified voice stream of the first conference call participant to eliminate the determined similarity; and
providing, by the processor, the modified voice stream to a communication device for audible presentation to the disadvantaged conference call participant while presenting, substantially simultaneously, the received voice stream, unmodified, to a third conference call participant.

17. The method of claim 16, further comprising:
receiving a request to discriminate between the first and third conference call participants, wherein the request identifies the first and third participants.

18. The method of claim 16, wherein the modified portion of the received voice stream is associated with interference.

19. The method of claim 17, wherein first and third speech profiles are generated for the first and third conference call participants, wherein the first and third speech profiles are a pitch profile, and wherein the spectral characteristic is at least one of a magnitude of a pitch value, a shape of the pitch distribution, and a location of the pitch distribution.

20. The method of claim 16, wherein the adjusting step comprises the substeps of:
decomposing the received voice stream into a plurality of subcomponents;
adjusting at least one of the subcomponents; and
recombining the subcomponents to form the modified voice stream, wherein, in the modified voice stream, the adjusted at least one subcomponent replaces the subcomponent from which the adjusted at least one subcomponent was derived.

21. A non-transitory computer readable comprising processor executable instructions that, when executed, perform the steps of claim 16.

22. The method of claim 16, wherein the first and a fourth conference call participant are in a common room and use a common communication device, wherein a common voice stream is received from the first and fourth conference call participants, the common voice stream comprising first and fourth voice streams from the first and fourth conference call participants, respectively, and further comprising:
identifying first and fourth voice components from the first and fourth voice streams, respectively, in the common voice stream, said identifying being by triangulation using a plurality of voice signals received from a plurality of microphones positioned at different locations in proximity to the first and fourth conference call participants to determine a physical location of each of the first and fourth conference call participants and, using the determined physical locations of the first and fourth participants, directional microphone techniques to distinguish the first and fourth voice streams from one another.

* * * * *

UNITED STATES PATENT AND TRADEMARK OFFICE
CERTIFICATE OF CORRECTION

PATENT NO. : 7,970,115 B1  
APPLICATION NO. : 11/244948  
DATED : June 28, 2011  
INVENTOR(S) : Marc W. J. Coughlan et al.

Page 1 of 1

It is certified that error appears in the above-identified patent and that said Letters Patent is hereby corrected as shown below:

At Column 12, line 23, after "computer readable" insert --medium-- therein.

Signed and Sealed this
Twenty-second Day of May, 2012

David J. Kappos  
*Director of the United States Patent and Trademark Office*